US005697056A

United States Patent [19]
Tayloe

[11] Patent Number: 5,697,056
[45] Date of Patent: Dec. 9, 1997

[54] COMMUNICATION SYSTEM IN WHICH RADIO SUBSCRIBER UNITS MITIGATE INTERFERENCE

[75] Inventor: Daniel Richard Tayloe, Phoenix, Ariz.

[73] Assignee: Motorola, Inc., Schaumburg, Ill.

[21] Appl. No.: 436,675

[22] Filed: May 8, 1995

[51] Int. Cl.⁶ .................................................. H04B 7/26
[52] U.S. Cl. .................. 455/33.2; 455/34.1; 455/54.1; 455/67.3; 455/13.4
[58] Field of Search .......................... 455/12.1, 13.4, 455/33.1, 33.2, 34.1, 34.2, 54.1, 62, 63, 67.3, 69, 226.2, 67.1

[56] References Cited

U.S. PATENT DOCUMENTS

| | | | |
|---|---|---|---|
| 4,785,450 | 11/1988 | Bolgiano et al. | 455/34.1 |
| 5,093,924 | 3/1992 | Toshiyuki et al. | 455/33.2 |
| 5,345,597 | 9/1994 | Strawcrynski et al. | 455/34.1 |
| 5,345,598 | 9/1994 | Dent | 455/54.1 |
| 5,394,561 | 2/1995 | Freeburg | 455/13.1 |

*Primary Examiner*—Chi H. Pham
*Attorney, Agent, or Firm*—Gregory J. Gorrie

[57] ABSTRACT

A cellular communication network (10) includes base stations located in orbiting satellites (12) and any number of subscriber units (26). The satellites (12) monitor the quality of signals received from subscriber units (26) and provide link quality indicator (62) data which subscriber units (26) interpret as instructions to adjust their transmit power levels. Subscriber units (26) evaluate received signal strength and received signal quality to determine whether the signals received at the subscriber units (26) are being interfered with. Subscriber units (26) evaluate the link quality indicator (62) and the quality of signals received at the subscriber units (26) to determine whether the signals received at the satellites (12) are being interfered with. When interference is detected, the subscriber units (26) request a hand-off to another channel (30) within the same cell (28).

13 Claims, 8 Drawing Sheets

COMMUNICATION SYSTEM IN WHICH RADIO SUBSCRIBER UNITS MITIGATE INTERFERENCE

CROSS-REFERENCE TO RELATED APPLICATIONS

This application is related to co-pending U.S. patent application Ser. Nos. 08/205,432 (IRI03057-Grubb), filed on Mar. 4, 1994, entitled "METHOD AND APPARATUS FOR BI-DIRECTIONAL POWER CONTROL IN A DIGITAL COMMUNICATION SYSTEM", which is assigned to the same assignee as the present application.

FIELD OF THE INVENTION

The present invention relates generally to radio communication systems. More specifically, the present invention relates to radio communication systems which dynamically configure their operations to mitigate interference.

BACKGROUND OF THE INVENTION

Interference is a constant concern in communication systems, and particularly in cellular communication systems. Interference occurs when undesired energy impedes the reception of a desirable communication signal. In the field of cellular communications, interference can lead to poor quality communications and dropped calls.

In cellular communications, subscriber units located in one cell communicate with a base station over a first set of communication channels. In adjacent cells, subscriber units communicate with base stations over different sets of communication channels. However, the first set of channels is reused in non-adjacent cells that reside at least a "reuse" distance away. In order to minimize interference between reused channels, the reuse distance is as large as possible.

Unfortunately, larger reuse distances result in less reuse of a frequency spectrum, preventing a cellular communication system from connecting more calls. Since cellular systems desire to connect as many calls as possible, reuse distance is kept to the minimum distance that achieves an acceptable level of interference. In conventional cellular systems, painstaking efforts are taken to locate cell sites, adjust power levels, adjust antenna structures, and allocate channels to cells so that interference is kept to tolerable levels and the frequency spectrum is used efficiently. Once cell site locations, power levels, antenna structures, and channel allocations are established for conventional systems, they tend to remain relatively static so that the delicate balance achieved between interference and efficient use of spectrum is not disturbed.

Nevertheless, some interference is inevitable. Interference may result from unusual geographic conditions, antenna sidelobes, and other factors. To further combat the unusual but nevertheless inevitable occurrence of interference, conventional base stations may implement interference detection processes for themselves and the subscriber units they support. When a base station determines that a call is being interfered with, the base station may instruct the affected subscriber unit to use a different channel. Accordingly, conventional cellular systems are structured so that interference is an unusual occurrence, and so that base stations are complex stations which have sufficient processing power to perform interference analyses for the subscriber units they support.

When cellular base stations are located in orbit around the earth, the interference problem becomes more complicated. In order to reduce cell size and reuse distance, base station satellites are desirably placed in low earth orbits, within which they travel at a high rate of speed. This causes the cells to move over the surface of earth, rendering ineffective the conventional interference-limiting techniques of placing cell sites at desirable locations and configuring antennas to accommodate particular geography. Consequently, interference may not be as unusual an occurrence as in conventional cellular systems.

Moreover, conventional "centralized" base station interference analysis techniques are unacceptable for cellular systems in which base stations are located in satellites orbiting the earth. Enormous costs are associated with placing a satellite in orbit, and base stations that are not simple, light-weight, highly reliable, and low power are impractical. Conventional centralized interference analysis techniques prevent base stations from having these characteristics due, at least in part, to the need to incorporate sufficient processing power to implement interference analysis processes for all channels supported by the base stations.

SUMMARY OF THE INVENTION

Accordingly, it is an advantage of the present invention that an improved method and apparatus for mitigating interference are provided. Another advantage is that the present invention provides an improved method and apparatus in which a subscriber unit detects interference. Another advantage is that the present invention implements an interference mitigation process compatible with the use of simple, light-weight, low power, highly reliable base stations located in orbiting satellites. Another advantage is that the present invention provides an improved method and apparatus for interference detection in which a subscriber unit detects interference occurring at the subscriber unit and at a base station.

The above and other advantages of the present invention are carried out in one form by a method for operating a radio subscriber unit having an ability to communicate over a plurality of communication channels. The method calls for communicating with a base station over a first one of the channels. A likelihood of interference is detected while communicating with the base station. In response to detecting the likelihood of interference, a message is transmitted to the base station. The message requests a second one of the channels for use in communicating with the base station.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
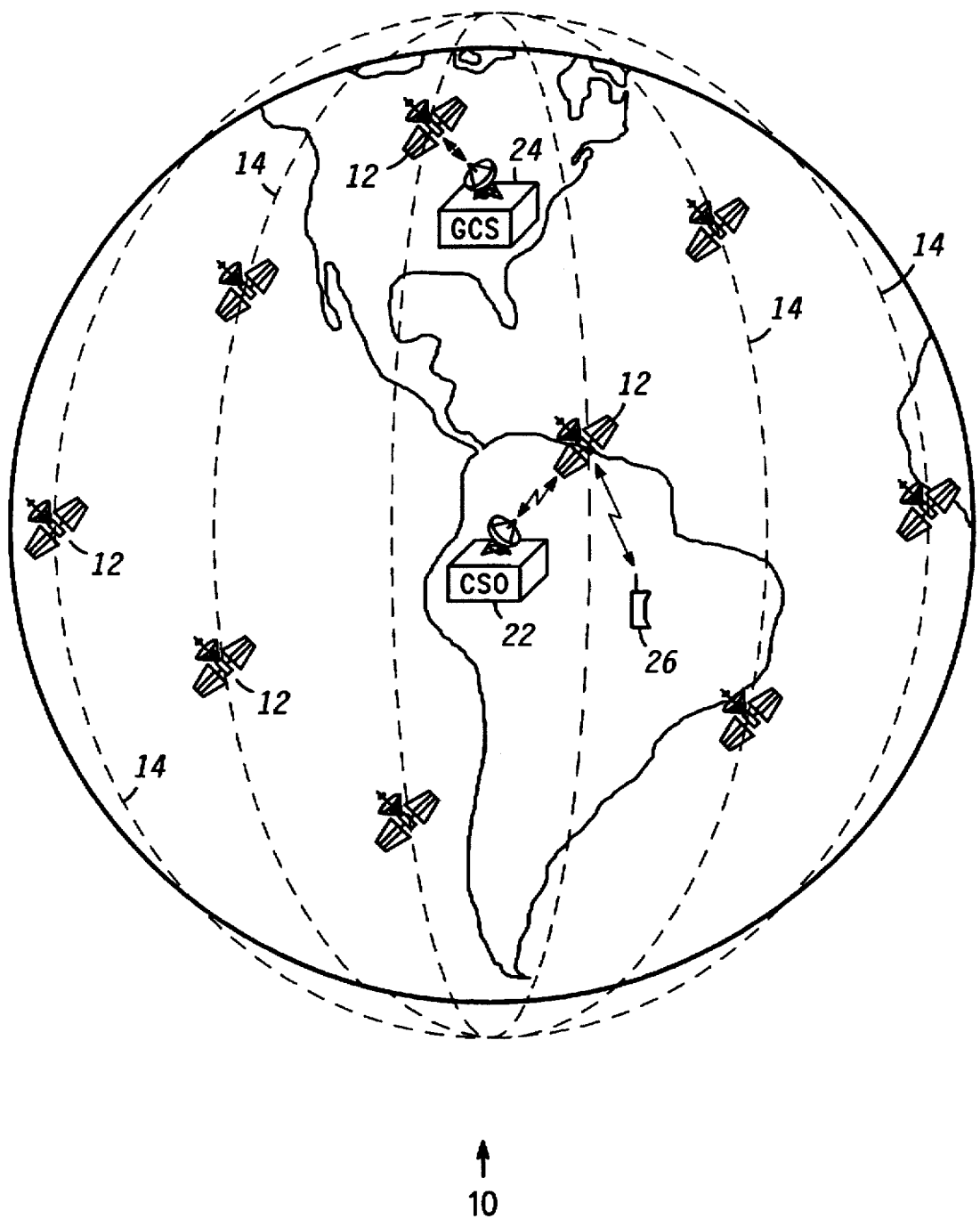
FIG. 1 shows an environment in which a cellular communication network may operate.

FIG. 1 illustrates a satellite-based cellular communication network 10. Network 10 is dispersed over the earth through the use of a constellation of above-the-earth base stations located in satellites 12. In the currently preferred embodiment, satellites 12 occupy polar, low-earth orbits 14. In particular, the preferred embodiment of network 10 uses six polar orbital planes, with each orbit holding eleven satellites 12 for a total of sixty-six satellites 12. For clarity, FIG. 1 illustrates only a few of these satellites 12.

Orbital planes 14 and satellites 12 are distributed around the earth. In the currently preferred embodiment, each orbit 14 encircles the earth at an altitude of around 765 km. Due to these relatively low orbits, substantially line-of-sight electromagnetic transmissions from any one satellite cover a relatively small area of the earth at any point in time. For example, when satellites 12 occupy orbits at around 765 km above the earth, such transmissions may cover "footprint" areas around 5000 km in diameter. Moreover, due to the low-earth character of orbits 14, satellites 12 travel with respect to the earth at around 25,000 km/hr.

Satellites 12 communicate with devices on the ground through many central switching offices (CSOs) 22, of which FIG. 1 shows only one, a few ground control stations (GCSs) 24, of which FIG. 1 shows only one, and any number of radio subscriber units (SUs) 26, of which one is shown in FIG. 1. CSOs 22, GCSs 24, and subscriber units 26 may be located anywhere on or near the surface of the earth.

GCSs 24 preferably perform telemetry, tracking, and control (TT&C) functions for the constellation of satellites 12. Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one satellite 12 is generally within view of each point on the surface of the earth at all times. Accordingly, network 10 may establish a communication circuit through the constellation of satellites 12 between any two subscriber units 26, between any subscriber unit 26 and a CSO 22, or between any two CSOs 22.

Figure 2:
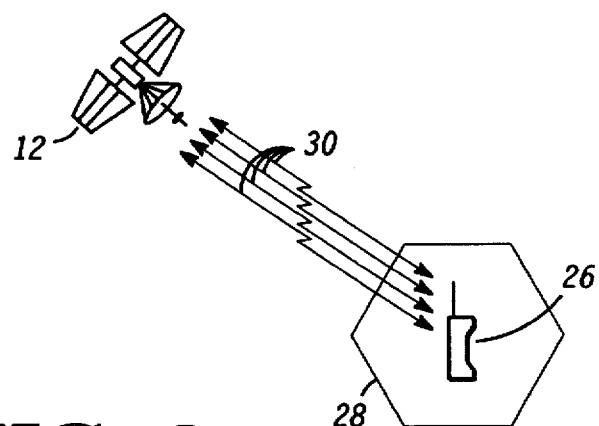
FIG. 2 shows a cell projected on the surface of the earth by a base station located in a satellite in orbit around the earth.

FIG. 2 shows a cell 28 projected on the surface of the earth by a base station satellite 12. Desirably, the area covered by cell 28 is much smaller than the entire footprint which is within range of a single satellite 12. Within cell 28, satellite 12 communicates over a plurality of communication channels 30. Communication channels 30 are desirably orthogonal to one another. In other words, communications may simultaneously take place over all of channels 30 without the channels 30 interfering with one another.

Channels 30 may be distinguished from one another through the use of conventional channel multiplexing techniques, such as time division multiple access (TDMA), frequency division multiple access (FDMA), or code division multiple access (CDMA), either alone or in combination with one another. In a preferred embodiment, a combination TDMA/FDMA scheme is used so that any single channel 30 is specified through identification of a time slot and a frequency channel.

Cells located adjacent to cell 28 (not shown) share a common boundary with cell 28. These adjacent cells may be projected on the surface of the earth by the same satellite 12 which forms cell 28 or by another satellite 12. Desirably, communication channels used in these adjacent cells are also orthogonal to channels 30 so that the likelihood of interference with communications in cell 28 and the adjacent cells is reduced. However, remote cells (not shown) which are not adjacent to cell 28 and are located further from cell 28 than the adjacent cells may reuse channels 30.

Desirably, the reuse distance between cell 28 and the nearest remote cell is as small as possible so that the greatest amount of spectral efficiency may be achieved. However, a consequence of reduced reuse distances is that occasional interference may occur between communications taking place in cell 28 over channels 30 and communications taking place in remote cells over the same channels 30. The interference may result, for example, from antenna sidelobes or an unusual geography between two interfering subscriber units 26.

An ongoing call involving a subscriber unit 26 is handed-off between cells when the subscriber unit 26 crosses a boundary between cells. The boundary-crossing results from the movement of satellites 12 and their projected cells even when the subscriber unit 26 remains stationary. The hand-off process involves switching communications from a first channel associated with one cell to a second channel associated with another cell. Desirably, the hand-off process is transparent to a user of subscriber unit 26. In addition, network 10 permits handing-off between channels 30 within cell 28 when an interference situation is likely. By handing-off a call to a new channel within the same cell 28, the chances of continued interference are unlikely because the uncommon set of circumstances which lead to interference are unlikely to be duplicated with a more or less random selection of another channel.

Figure 3:
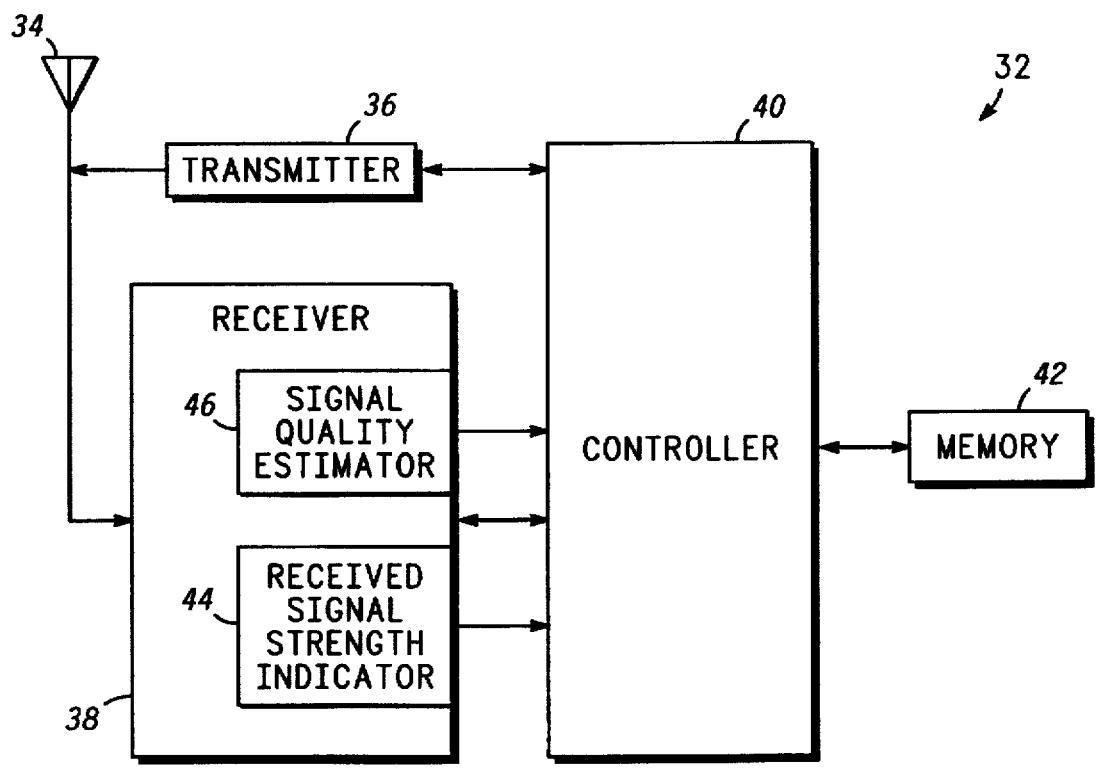
FIG. 3 shows a block diagram of a radio section which may be included in subscriber units and base stations.

FIG. 3 shows a block diagram of a radio section 32 which may be included in subscriber units 26 and base station satellites 12. Radio section 32 includes an antenna 34 which couples to a transmitter 36 and a receiver 38. A controller 40 couples to transmitter 36, to receiver 38, and to a memory 42. Controller 40 is a programmable device, such as a microprocessor or the like, which carries out tasks in accordance with software programming stored in memory 42. Controller 40 controls tuning for transmitter 36 and receiver 38, passes data to transmitter 36 for transmission, and collects data received by receiver 38.

Receiver 38 includes a received signal strength indicator (RSSI) 44. RSSI 44 provides controller 40 with a relatively instantaneous signal, data code, or other parameter that is responsive to the strength or amplitude of a received signal. In addition to the amplitude of a desired signal received over a communication channel, the RSSI parameter characterizes noise and interference. In other words, in an interference situation, the RSSI parameter may indicate the receipt of a strong signal due to the combination of the desired and interfering signals.

Receiver 38 also includes a signal quality, such as bit error rate (BER), estimator 46. The preferred embodiment of the present invention conducts digital communications. Thus, a received signal conveys one or more bits of data during each symbol period. The BER parameter represents one indication of signal quality. Higher BER values indicate worse signal quality. Phase error and $E_b/(N_o+I_o)$ are examples of other signal quality parameters.

Figure 4:
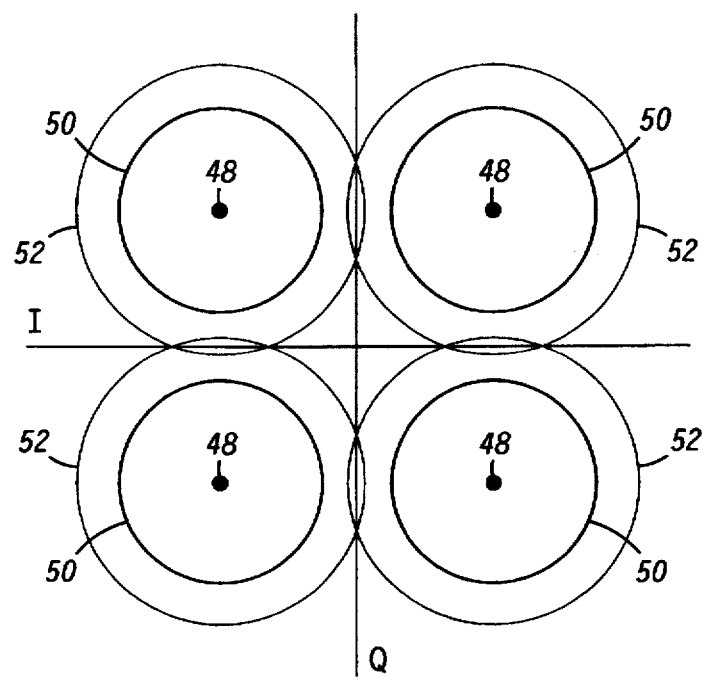
FIG. 4 shows a phase constellation diagram which depicts different signal quality levels.

FIG. 4 shows a phase constellation diagram which depicts different signal quality levels. In particular, FIG. 4 depicts a QPSK modulation example where two bits of data are conveyed during each symbol by an in-phase (I) and quadrature phase (Q) relationship that may exhibit any one of four different phase states. However, the present invention is not limited to QPSK or any other specific type of modulation. FIG. 4 shows points 48 at theoretical ideal values for the four allowed phase states. Assuming that receiver 38 is well synchronized, frequency offsets are compensated, and noise and interference are absent, receiver 38 will detect I, Q phase relationships in the received signal at points 48.

Of course, noise and interference are never absent. Thus, receiver 38 decides which phase state is being conveyed during a symbol in spite of some degree of phase error. Circles 50 and 52 depict two different signal quality levels, as represented by phase error. Circles 50 correspond to better signal quality, less phase error, lower BER, and lower $E_b/(N_o+I_o)$. Circles 52 correspond to worse signal quality, more phase error, higher BER, and higher $E_b/(N_o+I_o)$. Desirably, receiver 38 operates with a signal quality no worse than the threshold indicated by circles 50. At this level of signal quality, receiver 38 can generally distinguish the discrete conveyed phase states from one another, and therefore the communicated data, without making a significant number of decision errors.

However, receiver 38 occasionally encounters worse signal quality, as for example indicated by circles 52. The overlap between circles 52 shows that receiver 38 is likely to make a significant number of decision errors regarding the data being communicated by the received signals. The worse signal quality situation may be caused by a weak signal that is difficult to distinguish from noise even when no interference is present. The worse signal quality situation may also be caused by a weak or strong signal which is experiencing interference.

Referring back to FIG. 3, BER estimator 46 provides controller 40 with a relatively instantaneous signal, data code, or other parameter that is responsive to the quality of a received signal. The precise configuration of BER estimator 46 is unimportant, and will depend in part upon whether radio section 32 decodes forward error correction. Alternate embodiments may provide phase error or other estimators of signal quality.

Radio section 32 may be included in any subscriber unit 26 or satellite 12 with other components (not shown). In a satellite 12, radio section 32 or portions thereof may be duplicated as needed to simultaneously accommodate all communication channels supported by the satellite 12. Additional transmitters and receivers may be included to communicate with other satellites 12, CSO's 22 and GCS's 24 (see FIG. 1). In a subscriber unit 26, radio section 32 may be included with a keypad, display, microphone, speaker, vocoder, battery, and the like to provide a user interface and audio voice processing.

Figure 5:
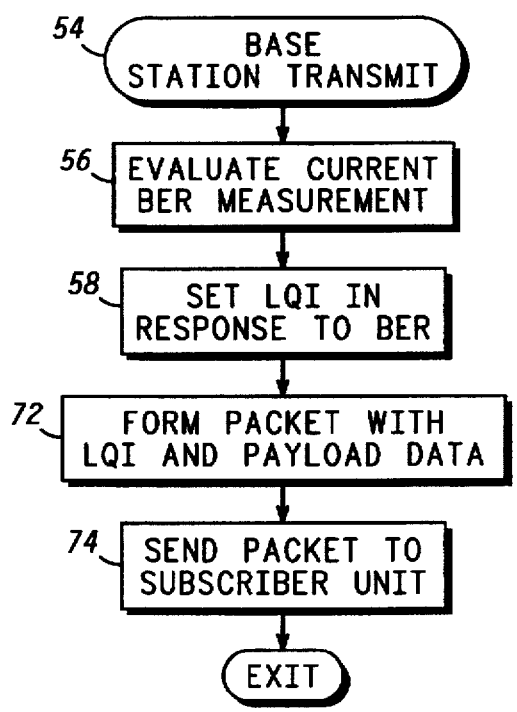
FIG. 5 shows a flow chart of a transmit process performed by base stations.

FIG. 5 shows a flow chart of a transmit process 54 performed by base station satellites 12. All of satellites 12 may perform a similar process. Process 54 is part of an overall communication process that is performed for each on-going call of each subscriber unit within range of the satellite 12. Generally, process 54 is performed to move data destined for a subscriber unit 26 toward that subscriber unit 26.

Process 54 includes a task 56 which evaluates a current BER measurement. The current BER measurement is responsive to the quality of the signal received at the satellite 12 from the subscriber unit 26 and may be determined in response to the parameter provided by signal quality estimator 46 (see FIG. 3). After task 56, a task 58 sets a link quality indicator (LQI) in response to the BER measurement.

Figure 6:
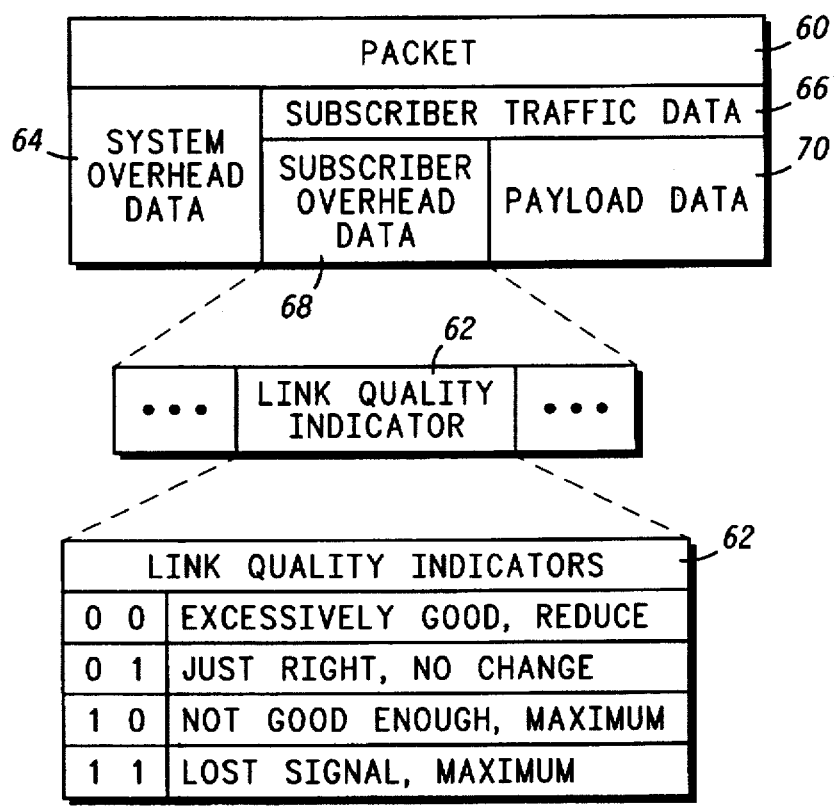
FIG. 6 shows a data format diagram of a packet utilized to convey a link quality indicator and other information within the cellular communication network.

FIG. 6 shows a data format diagram of an exemplary data packet 60 which network 10 (see FIG. 1) may use to convey a link quality indicator 62 and other information. Packet 60 includes system overhead data 64 and subscriber traffic data 66. System overhead data 64 generally include system control, management, and routing data along with a subscriber unit ID code. Subscriber traffic data 66 include subscriber overhead data 68 and payload data 70. The delivery of payload data 70 is the purpose of network 10. Payload data may, for example, include digitized audio voice data. Subscriber overhead data generally include data used by a subscriber unit 26 and satellite 12 to control the operation of a channel 30 allocated to the call. Such data include, for example, hand-off management control data, and such data include link quality indicator 62.

In a preferred embodiment, link quality indicator 62 is a two-bit code which a subscriber unit interprets as an instruction to adjust the subscriber unit transmit power level. As shown in FIG. 6, a code of 0,0 may indicate an "excessively good" received signal and an instruction to slightly reduce the subscriber unit transmit power level. A code of 0,1 may indicate a "just right" received signal and an instruction to refrain from changing the transmit power level. A code of 1,0 may indicate a "not good enough" received signal and an instruction to set subscriber unit transmit power level to a maximum setting. A code of 1,1 may indicate a "lost" received signal and an instruction to set subscriber unit transmit power level to a maximum setting.

Referring back to FIG. 5, task 58 sets a link quality indicator (LQI) code in response to the BER measurement obtained above in task 56. Low signal quality, such as a lost signal or the phase error level depicted by circles 52 in FIG. 4, causes task 58 to insert codes of 1,1 and 1,0, respectively, in accordance with the link quality indicator encoding scheme shown in FIG. 6.

After task 58, a task 72 forms a packet 60 (see FIG. 6) with the LQI and appropriate payload data, and a task 74 sends packet 60 to subscriber unit 26. After task 74, process 54 may perform other tasks related to transmitting payload data, as indicated by ellipsis. Eventually process 54 exits. However, process 54 may be performed for the next packet to be transmitted to a subscriber unit 26.

Figure 7:
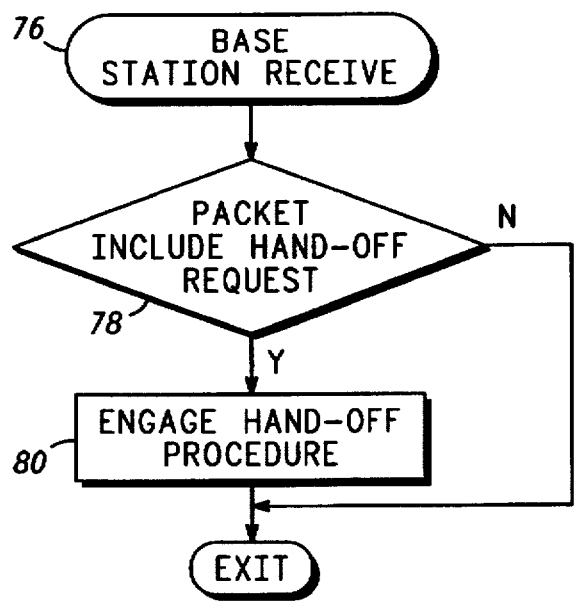
FIG. 7 shows a flow chart of a receive process performed by base stations.

FIG. 7 shows a flow chart of a receive process 76 performed by base station satellites 12. Process 76 is another part of the overall communication process performed for each on-going call from subscriber units within range of the satellite 12, and all of satellites 12 may perform a similar process. Generally, process 76 is performed to process data received in a packet 60 (see FIG. 6) from a subscriber unit 26.

Process 76 includes a query task 78 which determines whether a packet received at satellite 12 includes a hand-off request. A hand-off request is a message which the satellite interprets as a request made by a subscriber unit 26 to use a different communication channel from the one currently in use. The request may indicate parameters to use identifying the other channel. For example, such parameters may specify the identity of a cell into which a hand-off is being requested. The identified cell may be the subscriber unit's current cell or an adjacent cell.

When task 78 detects a hand-off request, a task 80 engages a hand-off procedure. Generally, a hand-off procedure reserves a channel in accordance with the requested parameters if possible, instructs the subscriber unit to tune to the new channel, then de-allocates the subscriber unit's old channel after operations commence on the new channel. The new channel may be provided by another base station, and this base station may communicate with the other base station in arranging the new channel.

After task 80 and when task 78 fails to detect a hand-off request, process 76 performs other tasks related to the receipt of a packet from a subscriber unit 26. Such other tasks may include the routing of payload data within base station satellite 12 so that such data may then be transmitted out from satellite 12 to their intended destination. Eventually, program control exits process 76, but process 76 may be performed again when another packet is received from this or another subscriber unit 26.

Figure 8:
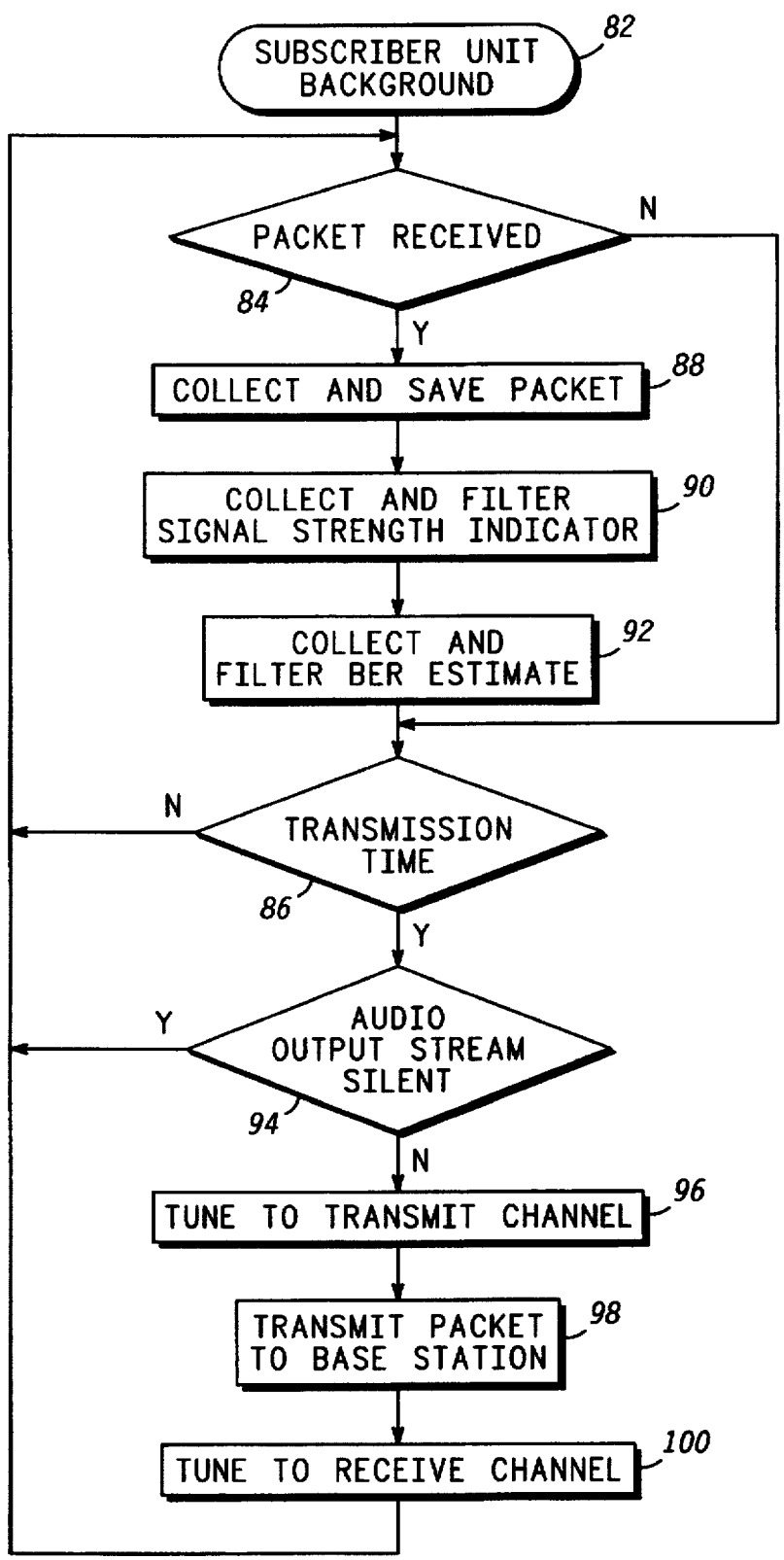
FIG. 8 shows a flow chart of a background process performed by subscriber units.

FIG. 8 shows a flow chart of a background process 82 performed by subscriber units 26. Process 82 is part of an overall communication process performed for an on-going call by the subscriber unit 26 engaged in the call. All subscriber units 26 may perform a similar process. Generally, process 82 is performed in a background mode to collect data from receiver 38 (see FIG. 3) and to pass data to transmitter 36 (see FIG. 3).

Process 82 includes a query task 84 which determines whether a packet 60 (see FIG. 6) is being received at subscriber unit 26. If no packet is being received, a query task 86 determines whether it is time to transmit a packet 60 to base station satellite 12. If it is not time to transmit a packet, process 82 may perform additional background tasks related to managing an ongoing call, as indicated by ellipsis. The other tasks may, for example, relate to operating a vocoder to collect audio voice data from a user and present audio voice data to a user. Eventually, program control returns to task 84 to again test for the receipt of a packet.

When task 84 detects the receipt of a packet, a task 88 collects and saves the packet from receiver 38 (see FIG. 3). Next, a task 90 collects the relatively instantaneous signal strength parameter from received signal strength indicator 44 (see FIG. 3) and filters this parameter. After task 90, a task 92 collects the relatively instantaneous BER parameter from signal quality estimator 46 (see FIG. 3) and filters this parameter. The type of filtering performed at tasks 90 and 92 is not important and may include averaging values obtained over a few past iterations of tasks 90 and 92. After task 92, program control proceeds to task 86 to test for transmission time.

When task 86 detects a transmission time, a query task 94 evaluates the audio output stream being transmitted away from subscriber unit 26 to determine whether the output stream is currently silent. If the output stream is currently silent, program control loops back to task 84, and process 82 refrains from transmitting a packet to satellite 12.

Significant portions of normal voice conversation are characterized by silence on the part of one or the other of the call participants. By refraining from transmitting during periods of silence, other subscriber units 26 whose communications may be interfered with have an opportunity to pass messages to a satellite 12 during the silent period requesting hand-off to another channel so that the interference may be avoided.

When task 94 determines that the audio output stream is not silent, a task 96 tunes transmitter 36 (see FIG. 3) to the transmit portion of the current channel 30 (see FIG. 2) if necessary. Next, a task 98 transmits a packet of data to the base station satellite 12. Portions of the packet may have been formulated in a foreground mode, as discussed below, and other portions may include digitized, non-silent audio information. After task 98, a task 100 tunes receiver 38 (see FIG. 3) to the receive portion of the current channel 30 if necessary. After task 100, program control loops back to task 84 to test for the receipt of another packet.

Figure 9:
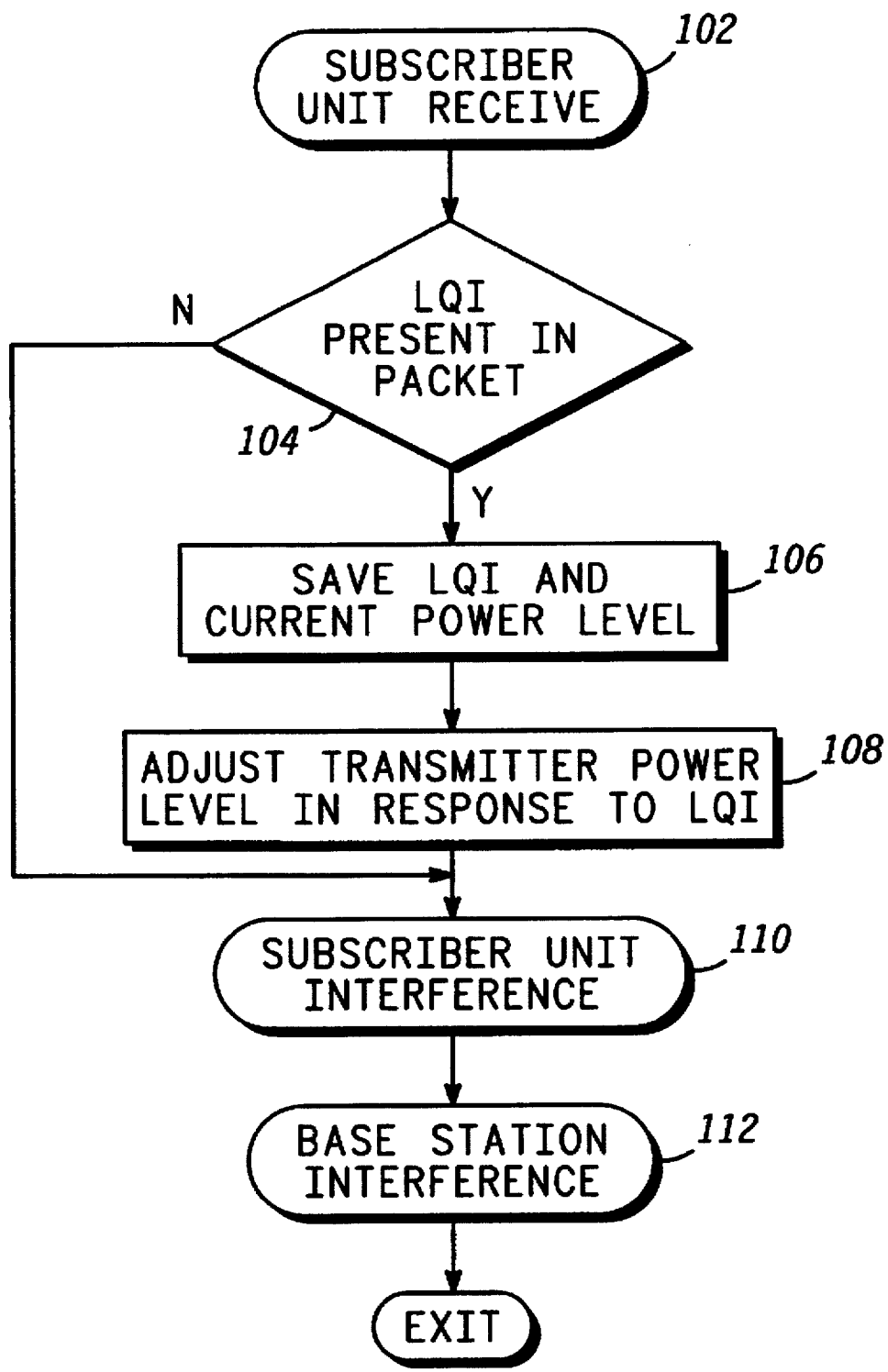
FIG. 9 shows a flow chart of a receive process performed by subscriber units.

FIG. 9 shows a flow chart of a receive process 102 performed by subscriber unit 26. Process 102 is a foreground part of the overall communication process performed for an on-going call by the subscriber unit 26 engaged in the call, and all subscriber units 26 may perform a similar process. Generally, process 102 process a packet which was collected and saved during task 88 of background process 82.

Process 102 includes a query task 104 which determines whether the packet includes a link quality indicator (LQI) 62 (see FIG. 6). If task 104 finds LQI 62, a task 106 saves the LQI code and the current subscriber unit transmit power level setting. After task 106, a task 108 interprets the LQI 62 as an instruction and adjusts the subscriber unit transmit power level setting accordingly.

Figure 10:
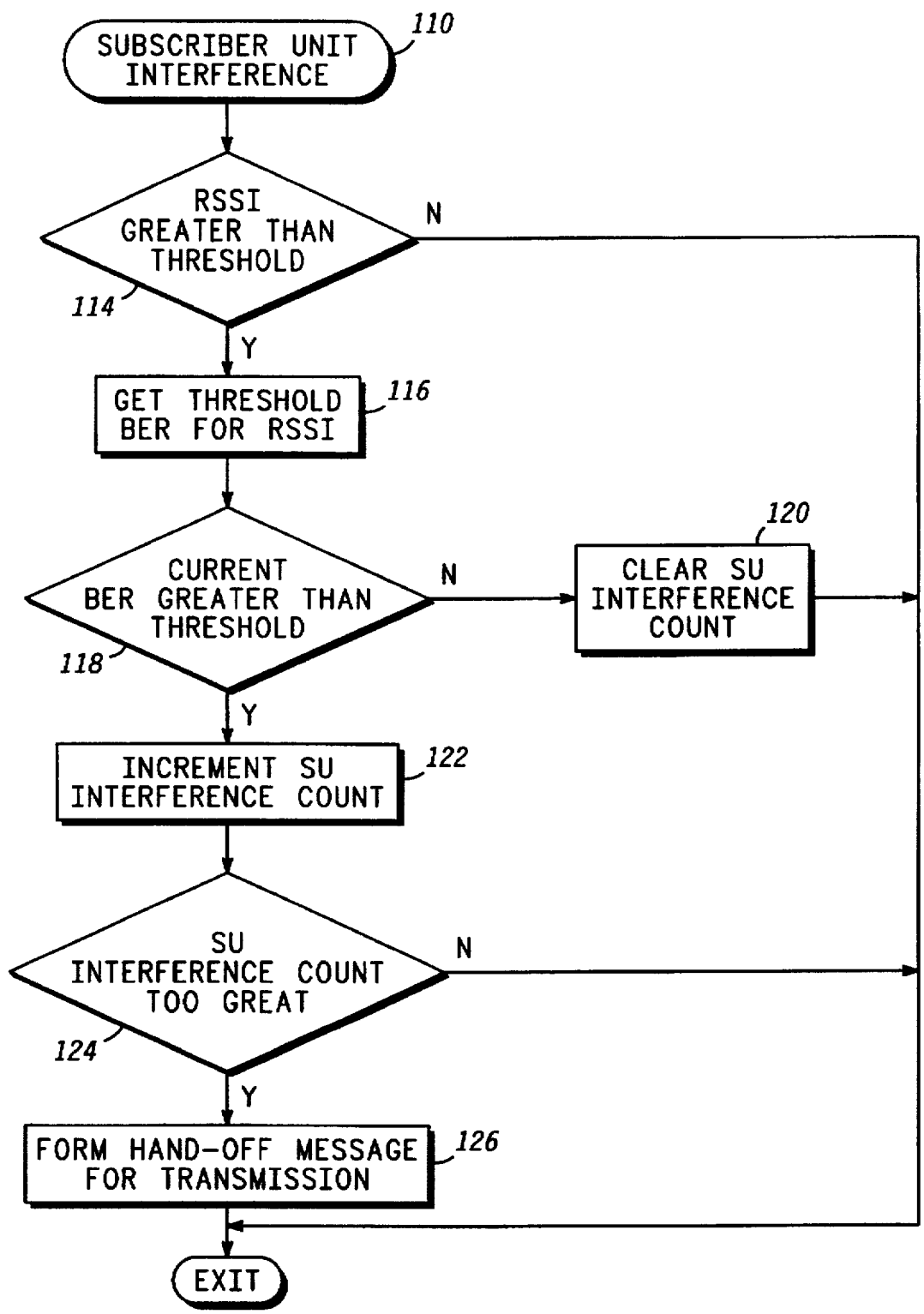
FIG. 10 shows a flow chart of a subscriber unit interference detection process performed by subscriber units.

After task 108 and when task 104 fails to find LQI 62 in the received packet, process 102 performs a process 110, in which subscriber unit 26 evaluates a likelihood of interference occurring at subscriber unit 26. Subscriber unit interference process 110 is discussed below in connection with FIG. 10. After process 110, a process 112 is performed, in which subscriber unit 26 evaluates a likelihood of interference occurring at base station satellite 12. Base station interference process 112 is discussed below in connection with FIG. 11.

After process 112, process 102 performs additional tasks, as indicated by ellipsis, related to processing a received packet. Such additional tasks may include the processing of received digitized voice audio data. Eventually, process 102 exits. However, process 102 may be performed again when another packet is received.

Figure 11:
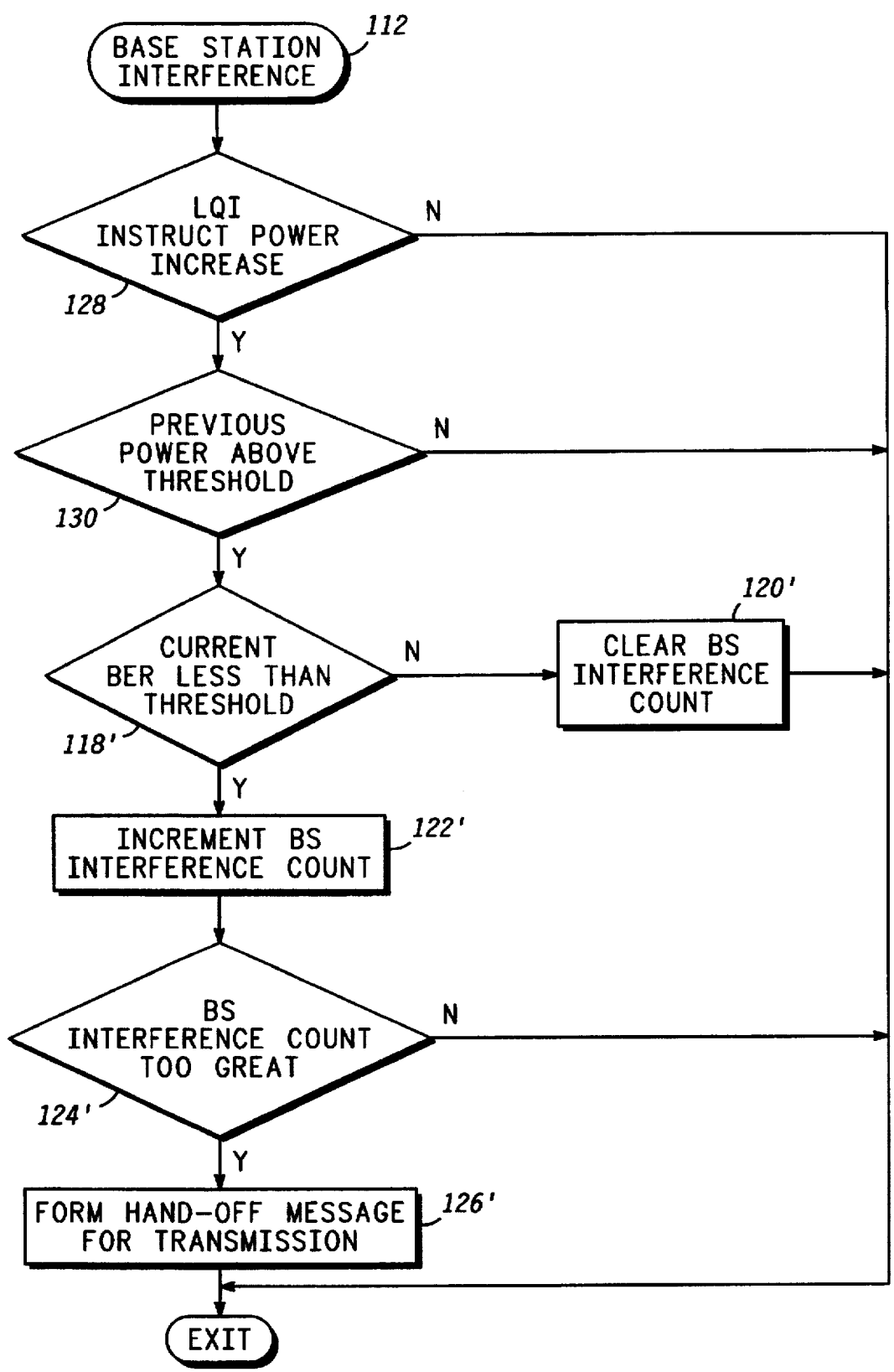
FIG. 11 shows a flow chart of a base station interference detection process performed by subscriber units.

FIG. 11 shows a flow chart of subscriber unit interference detection process 110. Generally, process 110 evaluates signal strength and signal quality parameters to determine the likelihood that communications received at subscriber unit 26 are being interfered with.

Process 110 includes a query task 114 which determines whether the received signal strength indicator (RSSI) parameter obtained above in task 90 (see FIG. 8) is greater than a predetermined threshold. Unless received signal strength is above this predetermined threshold, process 110 makes no further interference evaluation because subscriber unit 26 cannot be sufficiently certain whether or not interference is occurring. Program control exits process 110, and process 110 does nothing to request a hand-off to another channel 30 (see FIG. 2).

When task 114 determines that received signal strength exceeds the predetermined threshold, a task 116 gets a threshold bit error rate (BER) that is appropriate for the current signal strength. Greater signal quality (i.e. reduced BER) is expected with greater signal strength, assuming that no interference is present. In the preferred embodiment, task 116 obtains a BER threshold which roughly corresponds to the signal quality depicted by circles 50 in FIG. 4 for any strength signal greater than the predetermined threshold discussed above in connection with task 114.

After task 116, a query task 118 determines whether the current BER, obtained above in task 92 (see FIG. 8), is greater than the threshold BER obtained in task 116. In other words, task 118 determines if the received signal exhibits a signal quality worse than the signal quality corresponding to circles 50 in FIG. 4. If task 118 determines that the signal quality is not worse, a task 120 clears a subscriber unit (SU) interference count, and program control exits process 110. Process 110 does nothing to request a hand-off to another channel 30 (see FIG. 2).

When task 118 detects that the current received signal exhibits a signal quality worse than that corresponding to circles 50 in FIG. 4, a task 122 increments the SU interference count. Next, a query task 124 determines whether the SU interference count is now too great. For example, task 124 may evaluate whether the SU interference count has reached a predetermined value, such as three or four. Preferably, this predetermined value corresponds to a time period of one to two seconds. If the interference count is not too great, program control exits process 110. Process 110 does nothing at this time to request a hand-off to another channel 30.

When task 124 determines that the SU interference count is now too great, several sequential packets have been received with poor signal quality but at a signal strength that should yield good signal quality. In this situation, subscriber unit 26 concludes that a likelihood exists that received signals are being interfered with. A task 126 forms a hand-off request message for transmission to satellite 12. The message will be transmitted to satellite 12 during the next iteration of task 98 (see FIG. 8). Task 126 desirably requests a hand-off to another channel 30 within the current cell 28 (see FIG. 2) for subscriber unit 26. After task 126, process 110 exits.

Although not shown, subscriber unit 26 may respond to any instructions received from satellite 12 to retune to a different channel. Likewise, subscriber unit 26 may continue to send such hand-off request messages to satellite 12 until a response is received.

FIG. 11 shows a flow chart of base station interference detection process 112 performed by subscriber units 26. Generally, process 112 evaluates the signal quality parameter for signals received at subscriber unit 26 and the LQI 62 (see FIG. 6) received at subscriber unit 26 to determine the likelihood that communications received at base station satellite 12 are being interfered with.

Process 112 includes a query task 128 which determines whether the latest received LQI 62 instructs subscriber unit 26 to increase its transmit power level. Task 128 may evaluate the LQI data saved above in task 106 (see FIG. 9). If the latest LQI 62 does not instruct subscriber unit 26 to increase its transmit power level, then the satellite 12 is receiving a reasonably good quality signal from subscriber unit 12. Program control exits process 112, and process 112 does nothing to request a hand-off to another channel 30.

When the latest received LQI 62 instructs subscriber unit 26 to increase its transmit power level, a query task 130 is performed. Task 130 determines whether the transmit power level was already set above a predetermined threshold level before the LQI instruction was received. In the preferred embodiment, the predetermined threshold is slightly below the maximum power level. Task 130 may evaluate the data saved above in task 106 (see FIG. 9). If the previous power level setting was not above this threshold, the increase power instruction is consistent with normal, non-interference operation. Program control exits process 112, and process 112 does nothing to request a hand-off to another channel 30.

When task 130 determines that the instruction to increase transmit power occurred when transmit power was already above the threshold, process 112 performs tasks similar to those discussed above in connection with process 110 (see FIG. 10). In particular, tasks 118', 120', 122', 124', and 126' of process 112 are similar to tasks 118, 120, 122, 124, and 126, respectively, of process 110. However, task 118' operates with logic opposed to that described above for task 118, and tasks 120', 122', and 124' manipulate a base station (BS) interference count rather than the SU interference count discussed above in connection with process 110.

At task 118', process 112 determines whether the current received signal quality at subscriber unit 26 is better than a predetermined threshold. In other words, task 118' determines if signal quality of the received signal at subscriber unit 26 is good. Subscriber unit 26 concludes that, by reciprocity, the signal quality at satellite 12 should also be good if the signal quality at subscriber unit 26 is good. Since the LQI indicates a poor signal quality at satellite 12, subscriber unit 26 concludes that a likelihood of interference with signals received at base station satellite 12 exists. Tasks 122', 124' and 126' cause a hand-off request message to be transmitted to satellite 12 if the condition continues over the course of a few packets.

On the other hand, if signal quality at subscriber unit 26 is worse than that corresponding to a predetermined BER threshold, subscriber unit 26 can draw no conclusion regarding interference at base station satellite 12. In this situation, task 120' clears the BS interference count and program control exits process 112. In this case, process 112 does nothing to request a hand-off to another channel 30.

In summary, the present invention provides an improved method and apparatus for mitigating interference. A subscriber unit rather than a base station detects the presence of interference. An interference mitigation process compatible with the use of simple, light-weight, low power, highly reliable base stations located in orbiting satellites is implemented. Such satellites need not have the processing power required to perform interference analyses for all channels supported by the satellites. A subscriber unit detects interference occurring at either the subscriber unit or at a base station.

The present invention has been described above with reference to preferred embodiments. However, those skilled in the art will recognize that changes and modifications may be made in these preferred embodiments without departing from the scope of the present invention. For example, the present invention is not limited to being used in connection with orbiting satellites. Moreover, those skilled in the art will appreciate that functions equivalent to those described herein may be achieved using processes having differently configured tasks and sequencing. These and other changes and modifications which are obvious to those skilled in the art are intended to be included within the scope of the present invention.

What is claimed is:

1. A method for operating a radio subscriber unit having an ability to communicate over a plurality of communication channels, said method comprising the steps of:

communicating with a base station over a first one of said channels, wherein during the communicating step, said subscriber unit receives a digital communication signal;

detecting a likelihood of interference at said subscriber unit during said communicating step; and transmitting, in response to said detecting step, a message to said base station, said message requesting a second one of said channels for use in communicating with said base station;

wherein the detecting step comprises the steps of:

measuring a signal strength of said received digital communication signal; and measuring a received signal quality of said digital communication signal, said received signal quality based on a bit error rate, and the method includes the step of performing the transmitting step when the received signal quality is less than an expected signal quality corresponding with said measured signal strength.

2. A method as claimed in claim 1 further comprising the steps of:

said subscriber trait transmitting signals to said base station at a transmit power level; and detecting a likelihood of interference at said base station during said communicating step; and wherein said digital communication signals received from said base station at said subscriber unit include a link quality indicator which indicates the signal quality of signals received at said base station transmitted from said subscriber unit;

and wherein the method includes the step of performing the transmitting step when said link quality indicator indicates that a signal quality received at said base station is less than an expected signal quality corresponding with said transmit power level.

3. A method as claimed in claim 1 wherein said detecting step comprises the steps of:

measuring a first parameter which is responsive to the strength of said received signal; and measuring a second parameter which is responsive to the quality of said received signal.

4. A method as claimed in claim 3 wherein:

said subscriber unit receives said digital communication signal with less than said predetermined signal quality when substantially no interference is occurring at said subscriber unit and when said received signal strength is greater than a predetermined amplitude; and said detecting step additionally comprises the step of evaluating whether said second parameter indicates said received signal quality that is worse than said predetermined signal quality when said received signal strength is greater than said predetermined amplitude.

5. A method as claimed in claim 2 wherein the communicating step includes the step of transmitting a stream of audio information during said communicating step, and said communicating step additionally comprises the steps of:

determining whether said stream of audio information is conveying silence;

performing the transmitting step when said determining step determines that said stream of audio information is not conveying silence; and refraining from performing the transmitting step when said determining step determines that said stream of audio information is conveying silence.

6. A method for operating a radio subscriber unit having an ability to communicate over a plurality of communication channels, said method comprising the steps of:

communicating with a base station over a first one of said channels;

detecting a likelihood of interference during said communicating step; and transmitting, in response to said detecting step, a message to said base station, said message requesting a second one of said channels for use in communicating with said base station, wherein said communicating step comprises the step of receiving a digital communication signal, and said detecting step comprises the steps of:

measuring a first parameter which is responsive to the strength of said received signal; and measuring a second parameter which is responsive to the quality of said received signal, wherein said first parameter measuring step comprises the steps of:

generating instantaneous first parameter values; and filtering said instantaneous first parameter values.

7. A method for operating a radio subscriber unit having an ability to communicate over a plurality of communication channels, said method comprising the steps of:

communicating with a base station over a first one of said channels;

detecting a likelihood of interference during said communicating step; and transmitting, in response to said detecting step, a message to said base station, said message requesting a second one of said channels for use in communicating with said base station, wherein said communicating step comprises the step of receiving a digital communication signal, and said detecting step comprises the steps of:

measuring a first parameter which is responsive to the strength of said received signal; and measuring a second parameter which is responsive to the quality of said received signal, and wherein said second parameter measuring step comprises the steps of:

generating instantaneous second parameter values; and filtering said instantaneous second parameter values.

8. A method of operating a radio subscriber unit having an ability to communicate over a plurality of communication channels, the method comprising the steps of:

transmitting signals to a base station at a transmit power level over a first communication channel;

receiving a digital communication signal from said base station;

detecting a likelihood of interference at said base station during said transmitting step; and transmitting, in response to said detecting step, a message to said base station, said message requesting a second one of said channels for use in communicating with said base station, wherein said digital communication signals received from said base station at said subscriber unit include a link quality indicator which indicates the signal quality of said signals received by said base station transmitted from said subscriber unit;

and wherein the method includes the step of performing the transmitting step when said link quality indicator indicates that a signal quality received at said base station is less than an expected signal quality corresponding with said transmit power level.

9. A method as claimed in claim 8 wherein the communicating step includes the step of transmitting a stream of audio information during said communicating step, and said communicating step additionally comprises the steps of:

determining whether said stream of audio information is conveying silence;

performing the transmitting step when said determining step determines that said stream of audio information is not conveying silence; and refraining from performing the transmitting step when said determining step determines that said stream of audio information is conveying silence.

10. A method for operating a radio subscriber unit having an ability to communicate over a plurality of communication channels, said method comprising the steps of:

communicating with a base station over a first one of said channels;

detecting a likelihood of interference during said communicating step; and transmitting, in response to said detecting step, a message to said base station, said message requesting a second one of said channels for use in communicating with said base station, wherein said subscriber unit is configured to transmit a stream of audio information during said communicating step, and said communicating step additionally comprises the steps of:

determining whether said stream of audio information is conveying silence;

transmitting said audio information when said determining step determines that said stream of audio information is not conveying silence; and refraining from transmitting said audio information when said determining step determines that said stream of audio information is conveying silence.

11. A radio subscriber unit for communicating with a base station over a plurality of communication channels, said subscriber unit comprising:

a radio transceiver for receiving a digital communication signal; and a controller coupled to said transceiver, said controller being configured to tune said transceiver to a first channel, determine a likelihood of interference at said subscriber unit while communications take place over said first channel, and cause said transceiver to transmit a message to said base station in response to a determination of likely interference, said message requesting a second channel for use by said subscriber unit in communicating with said base station, wherein:

the radio transceiver measures a signal strength of said received digital communication signal, and measures a received signal quality of said digital communication signal, said received signal quality based on a bit error rate, and said controller causes said transceiver to transmit said message when the received signal quality is less than an expected signal quality corresponding with said measured signal strength.

12. A radio subscriber unit as claimed in claim 11 wherein:

said transceiver is configured to transmit signals to said base station at a transmit power level; and and said controller is further configured to detect a likelihood of interference at said base station during the transmission of said signals, and wherein said digital communication signals received from said base station at said subscriber unit include a link quality indicator which indicates the signal quality of said signals received at said base station transmitted from said subscriber unit;

and wherein the controller transmits said message when said link quality indicator indicates that a signal quality received at said base station is less than a predetermined signal quality that corresponds with said transmit power level.

13. A radio subscriber unit as claimed in claim 12 wherein said transceiver is further configured to transmit a stream of audio information, and said controller is further configured to determine whether said stream of audio information is conveying silence, and wherein said controller is further configured to cause said transceiver to transmit said message when said controller determines that said stream of audio information is not conveying silence; and said controller is further configured to cause said transceiver to refrain from transmitting said message when said controller determines that said stream of audio information is conveying silence.

* * * * *

UNITED STATES PATENT AND TRADEMARK OFFICE
CERTIFICATE OF CORRECTION

PATENT NO. : 5,697,056
DATED : December 9, 1997
INVENTOR(S) : Daniel Richard Tayloe It is certified that error appears in the above-indentified patent and that said Letters Patent is hereby corrected as shown below:

In column 11, claim 2, line 16, delete "trait" and insert --unit--.

Signed and Sealed this

Twenty-first Day of April, 1998

Attest:

BRUCE LEHMAN

*Attesting Officer*   *Commissioner of Patents and Trademarks*